United States Patent
Khidekel et al.

(10) Patent No.: US 6,636,975 B1
(45) Date of Patent: Oct. 21, 2003

(54) ACCESSING A SECURE RESOURCE USING CERTIFICATES BOUND WITH AUTHENTICATION INFORMATION

(75) Inventors: Yuri Khidekel, Lafayette, CA (US); Alex Balashov, Dublin, CA (US); Sergey Kisurin, San Ramon, CA (US)

(73) Assignee: Identix Incorporated, Minnetonka, MN (US)

( * ) Notice: Subject to any disclaimer, the term of this patent is extended or adjusted under 35 U.S.C. 154(b) by 0 days.

(21) Appl. No.: 09/464,214

(22) Filed: Dec. 15, 1999

(51) Int. Cl.$^7$ .................................................. H04L 9/32

(52) U.S. Cl. ...................................... 713/202; 713/156

(58) Field of Search .................................. 713/155, 156, 713/157, 158, 186, 200–202; 382/115

(56) References Cited

U.S. PATENT DOCUMENTS

| | | | | |
|---|---|---|---|---|
| 5,005,200 A | * | 4/1991 | Fischer | 380/30 |
| 5,481,720 A | * | 1/1996 | Loucks et al. | 713/201 |
| 5,590,199 A | * | 12/1996 | Krajewski et al. | 713/159 |
| 5,706,427 A | * | 1/1998 | Tabuki | 713/201 |
| 5,841,970 A | * | 11/1998 | Tabuki | 713/201 |
| 5,930,804 A | * | 7/1999 | Yu et al. | 707/104 |
| 5,944,824 A | * | 8/1999 | He | 713/201 |
| 5,987,232 A | * | 11/1999 | Tabuki | 713/201 |
| 6,016,476 A | * | 1/2000 | Maes et al. | 705/1 |
| 6,035,402 A | * | 3/2000 | Vaeth et al. | 713/201 |
| 6,161,185 A | * | 12/2000 | Guthrie et al. | 713/201 |
| 6,167,518 A | * | 12/2000 | Padgett et al. | 713/186 |
| 6,189,103 B1 | * | 2/2001 | Nevarez et al. | 713/201 |
| 6,275,941 B1 | * | 8/2001 | Saito et al. | 713/201 |
| 6,356,937 B1 | * | 3/2002 | Montville et al. | 709/206 |

FOREIGN PATENT DOCUMENTS

WO 00/65770 * 11/2000 ............. H04L/9/30

OTHER PUBLICATIONS

"PTO's Enterprise Wide Login User's Guide" Version 1.0 p. 1–8, Jun. 1999.*
Neuman et al, "Kerberos: An Authentication Service for Computer Networks" Sep. 1994, IEEE Communications Magazine, p. 33–38.*
Schneier, "Applied Cryptography" 1996, John Wiley & Sons, Inc., $2^{nd}$ Edition, p. 566–572.*
"Identix Introduces the First Authenticated Certificate– The Next Level of Identity Protection for Internet Security and Secure E–Business", Company Press Release, http://biz.yahoo.com/bw/991116/nv_identix_1.html, 3 pgs, Nov. 16, 1999.
Wahab et al, "Biometrics Electronic Purse" 1999, IEEE, p. 958–961.*
Lampson, "Computer Security", Digital Equipment Corporation, p. 1–54.*

* cited by examiner

Primary Examiner—Gail Hayes
Assistant Examiner—Christopher Revak
(74) Attorney, Agent, or Firm—Beyer Weaver & Thomas, LLP.

(57) ABSTRACT

A method and computer program product for accessing a secure resource using a certificate bound with authentication information. In one implementation, the method includes receiving a certificate request from a user, the certificate request including identification information and authentication information associated with the user; verifying the identification information; issuing a certificate to the user when the identification information is verified; and sending the authentication information and a certificate identifier for the certificate to an authentication server. According to one aspect, the sending step includes signing a combination of the authentication information and the certificate identifier to form a unique user identifier; signing the authentication information; and sending the unique user identifier to the authentication server.

18 Claims, 6 Drawing Sheets

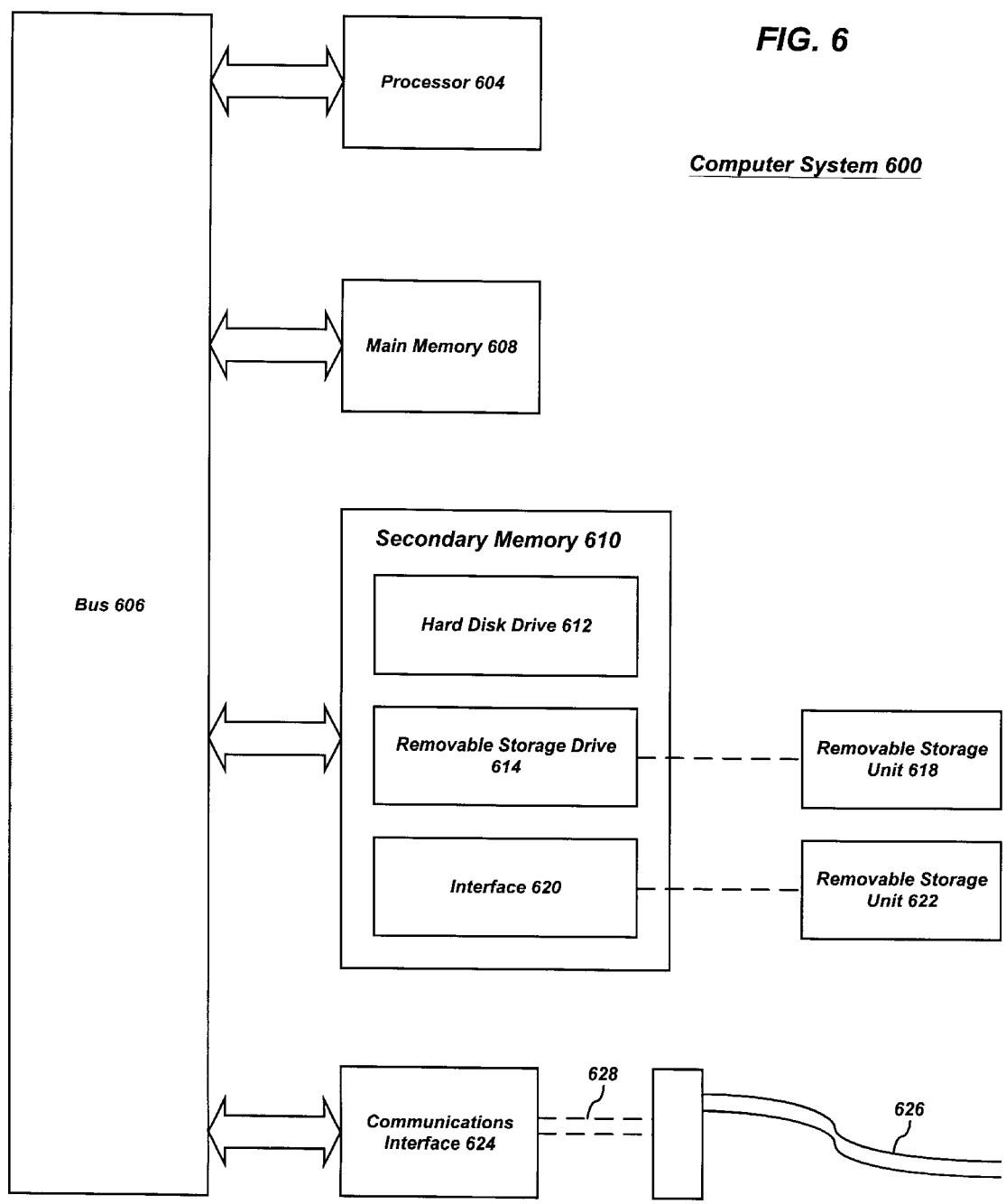

ACCESSING A SECURE RESOURCE USING CERTIFICATES BOUND WITH AUTHENTICATION INFORMATION

BACKGROUND

The present invention relates generally to systems and methods for secure client-server communication, and more specifically to secure client-server communication using certificates and user biometrics.

To facilitate secure electronic communications over public networks, such as the Internet, it is necessary that parties engaging in applications such as electronic commerce authenticate each other. Authentication is the process of verifying the identity of a party. One popular authentication technique is the use of digital certificates. The use of digital certificates in allowing a user to access a secure server is discussed with reference to FIG. 1.

FIG. 1 depicts a system 100 for use in secure communications using digital certificates. Referring to FIG. 1, a user 101 desires secure communications with a secure server 112 using a browser application 104 running on a client computer 102. The communications will take place over a public network such as Internet 110. In order to facilitate these electronic communications, each party to the communication (that is, secure server 112 and user 101) obtains a digital certificate from a certificate authority 114.

According to conventional methods, an entity obtains a certificate by the following method. The entity submits a request for a certificate, along with identification information identifying the entity, to a certificate authority. The certificate authority verifies the identity of the entity using the identification information. The certificate authority then generates a certificate, signs it using a private key, and transmits the certificate to the entity. Parties wishing to authenticate the entity obtain the certificate from the entity and verify the certificate signature using the certificate authority's public key.

To establish a secure connection, digital certificates are exchanged between parties using a mechanism referred to as secure sockets layer (SSL) protocol. This mechanism permits the automatic exchange of digital certificates between parties.

Information exchange between parties has become increasingly secure with the SSL protocol and digital certificates, rendering computer-to-computer data transmissions essentially tamper-proof. However, unauthorized parties can participate in a human-to-computer session as unknown and undetected imposters, because unique user authentication is not ensured during an SSL session. Conventional SSL techniques ensure only the identity of the computer in the transaction, and not the identity of the computer's user.

Another disadvantage of the conventional SSL process is that a certificate authority is involved only in the creation of certificates. It is not involved in the transactions using the certificates. However, it is desirable to exclude certificates that are no longer valid from these transactions. Certificate authorities address this issue by publishing certificate revocation lists that list invalid certificates. However, in order to prevent the use of invalid certificates, a secure server must frequently check the revocation lists published by each certificate authority. Because these lists are very large, this is a time-consuming process. Further, once a certificate is revoked, a significant amount of time may elapse before the corresponding revocation list is updated to reflect the revocation. For these reasons, revocation lists are inconvenient and unreliable. Therefore, operators of secure servers are reluctant to employ this mechanism.

SUMMARY

The present invention is a method and computer program product for accessing a secure resource using a certificate bound with authentication information.

In one implementation, the method includes receiving a certificate request from a user, the certificate request including identification information and authentication information associated with the user; verifying the identification information; issuing a certificate to the user when the identification information is verified; and sending the authentication information and a certificate identifier for the certificate to an authentication server.

According to one aspect, the sending step includes signing a combination of the authentication information and the certificate identifier to form a unique user identifier; signing the authentication information; and sending the unique user identifier to the authentication server.

According to one aspect, the authentication information includes at least one of a password, smartcard information, and biometric information.

According to one aspect, the biometric information includes information describing at least one of a fingerprint, facial scan, voice print, or iris scan of the user.

In one implementation, the method includes receiving a certificate for a user and a request for access for the user to the secure server; sending an authentication query regarding the user to an authentication server; receiving a delta in response to the authentication query, the delta indicating the amount of time that has passed since the user was last authenticated by the authentication server; comparing the delta to a predefined threshold; and granting access when the predefined threshold exceeds the delta.

According to one aspect, the method also includes denying access when the delta exceeds the predefined threshold.

In one implementation, the method includes sending a request for access to a secure server, the request containing a certificate associated with a user; sending the certificate and authentication information to an authentication server when the secure server denies access; and sending the certificate and request to the secure server again when an indication of authentication is received from the authentication server.

In one implementation, the method includes receiving, from a secure server, a request to authenticate a user; determining a delta indicating the amount of time that has passed since the user was last authenticated by the authentication server; and sending the delta to the secure server.

In one implementation, the method also includes receiving a certificate and authentication information from a user that has been denied access to a secure server; authenticating the user based on the certificate, the received authentication information, and stored authentication information associated with the certificate; and resetting the delta when the user is authenticated.

Further features and advantages of the present invention as well as the structure and operation of various implementations of the present invention are described in detail below with reference to the accompanying drawings. In the drawings, like reference numbers indicate identical or functionally similar elements. Additionally, the left-most digit of a reference number identifies the drawing in which the reference number first appears.

BRIEF DESCRIPTION OF THE FIGURES

The present invention will be described with reference to the accompanying drawing.

FIG. 6 depicts an exemplary computer system that can be programmed to carry out the present invention.

DETAILED DESCRIPTION

Figure 1:
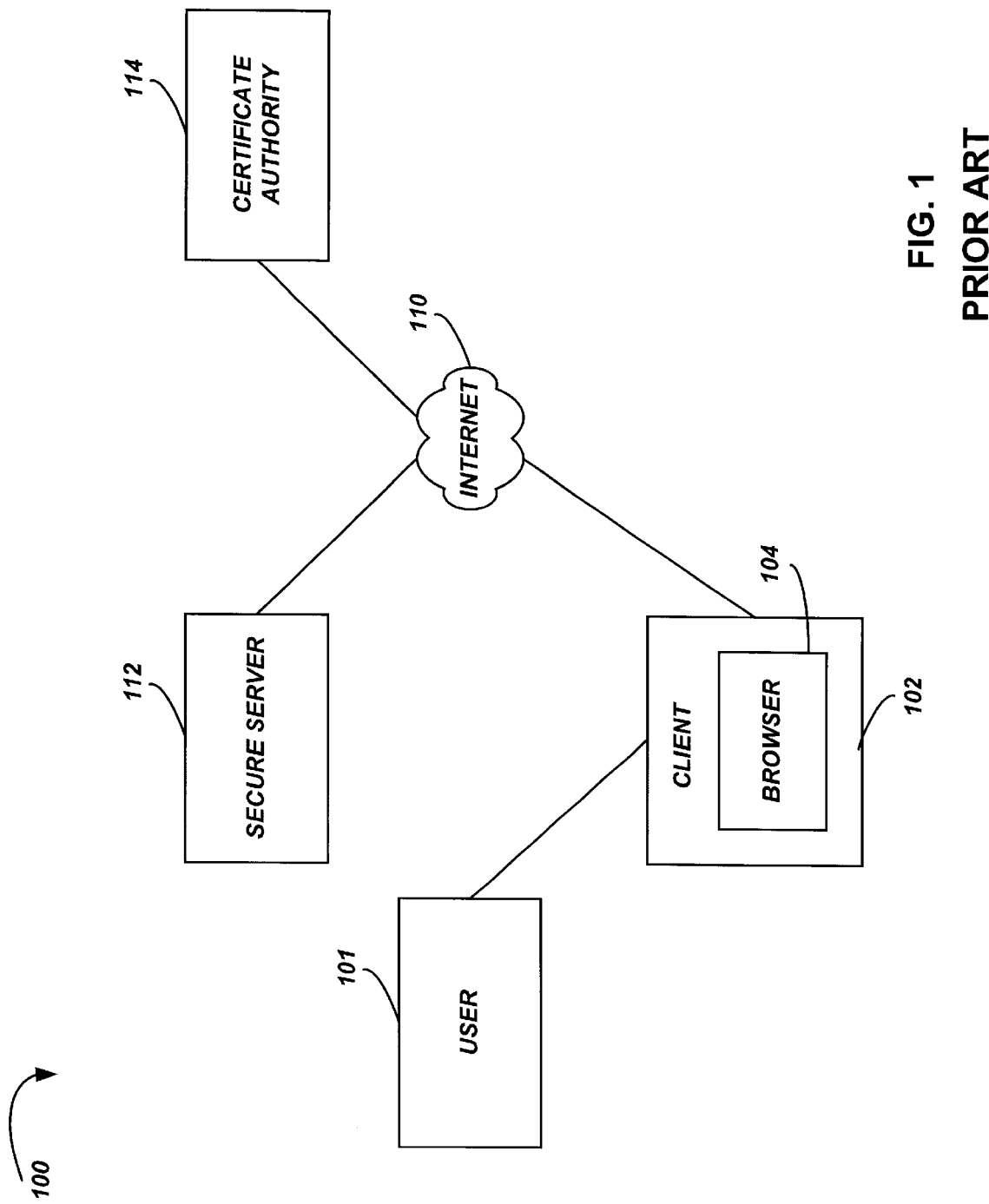
FIG. 1 depicts a conventional system for use in secure communications using digital certificates.
Figure 2:
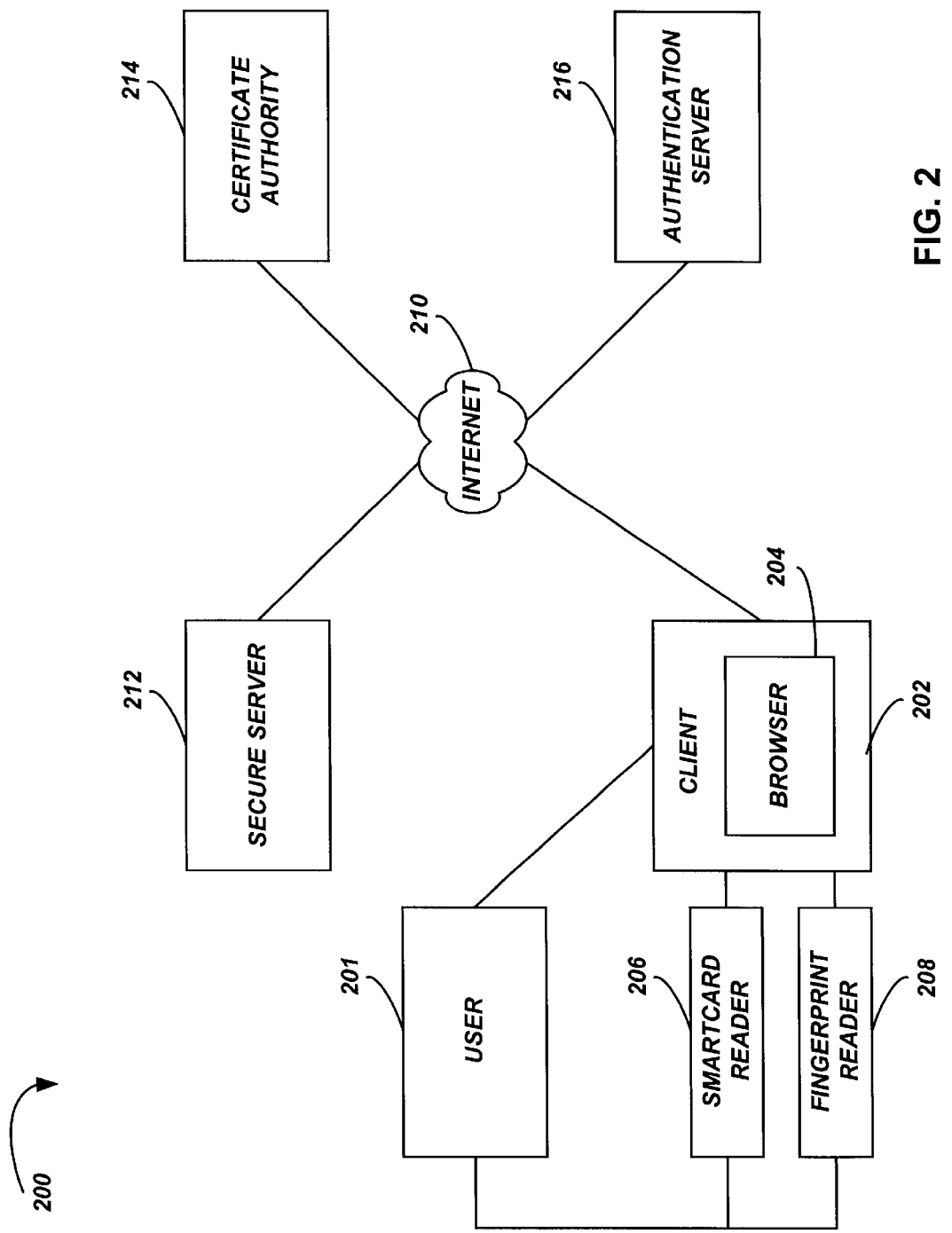
FIG. 2 depicts a system for use in secure communications according to the present invention.

FIG. 2 depicts a system 200 for use in secure communications according to the present invention. The system provides secure communications between a client 202 executing a browser 204 and a secure server 212 over a public network 210 such as the Internet. The present invention ensures authentication, not only of client 202, but also of user 201. As part of the certificate registration process, the user submits unique authentication information. This authentication information can include data describing a user fingerprint captured by fingerprint reader 208; this data is referred to herein as "minutia." Processes for generating minutia are described in U.S. Pat. No. 5,748,766 entitled "Method And Device For Reducing Smear In A Rolled Fingerprint Image" and U.S. Pat. No. 5,528,355 entitled "Electro-Optic Palm Scanner System Employing A Non-Planar Platen", both assigned to the assignee of the present application and incorporated herein by reference.

The authentication information could also include data describing a smartcard captured by a smartcard reader 206. This authentication information could also include a password or the like supplied by user 201.

The authentication information is submitted to the certificate authority, along with user identification information that can be verified by the certificate authority. An example of the identification information is a credit card number. The certificate authority can verify this information with the credit card company that issued the card.

The certificate authority verifies the identification information, creates a user certificate, binds the certificate with the authentication information, stores the authentication information, and returns the certificate to user 201. Then, during each access attempt at secure server 212, the secure server communicates with authentication server 216 to authenticate the user. Thus, during each transaction, the user is authenticated.

The certificate authority binds the authentication information to the certificate by combining them and signing the combination to produce a unique user identifier (UUI). The UUI is sent to the authentication server from the certificate authority.

One advantage of authenticating the user during each transaction is that invalid certificates can be detected immediately and denied access to the secure server. Further, revoking a certificate is simple and immediate. To revoke a certificate, the corresponding entry is simply removed from authentication server 216.

A further advantage of the use of an authentication server is that, because it is involved in each transaction, usage charges can be made on a per-transaction basis. In contrast, a certificate authority is only involved once in the life of a certificate, and so charges on a per-certificate basis. A further advantage of the present invention results from the use of authentication information in the authentication process. Authentication information includes "what you have," "who you are," and "what you know." An example of "what you have" is a smartcard. A smartcard is an electronic device of credit card size that includes an electronic memory storing information regarding a user that can be used for access to a secure entity. An example of "who you are" is biometric information. The biometric information can include information describing a user's fingerprint, facial scan, voice print, iris scan and the like. For example, a fingerprint is a useful biometric in ensuring the identity of a user. An example of "what you know" is a password. The set of authentication information that is required to access a secure server can be embodied in a security policy module used by the secure server. The set of authentication information that is required to obtain a certificate can be embodied in a security policy module used by the certification authority.

A unique feature of the present invention is the binding of the certificate and the authentication information at the moment of user registration with the certificate authority. The certificate authority signs both the certificate and the authentication information at the time of registration. This binding process ensures that the certificate and the authentication information belong to the same individual.

Currently, the most popular method of authenticating users accessing secure sites is through the use of user name/password combinations. Many secure sites assign user names and passwords arbitrarily instead of allowing users to chose them. Further, most secure sites enforce unique user names. For these reasons and others, the average user must remember a large set of user name/password combinations. Therefore, many users resort to recording their user name/password combinations, or to selecting combinations that are easy to remember and therefore easy to guess. Thus, this approach is both inconvenient and insecure. The present invention provides a convenient and secure access method for users to access secure sites.

One increasingly popular way to access secure services is by telephone using a "smart phone." A smart phone is a phone that is connected to the Internet for use as a web device for accessing secure services, such as banks and brokers. Because it is difficult to enter an alphanumeric username/password combination on a smartphone keypad, most users resort to numeric passwords. Purely numeric passwords are easily cracked. Thus this method is also insecure, and would benefit greatly from the use of the present invention.

Figure 3:
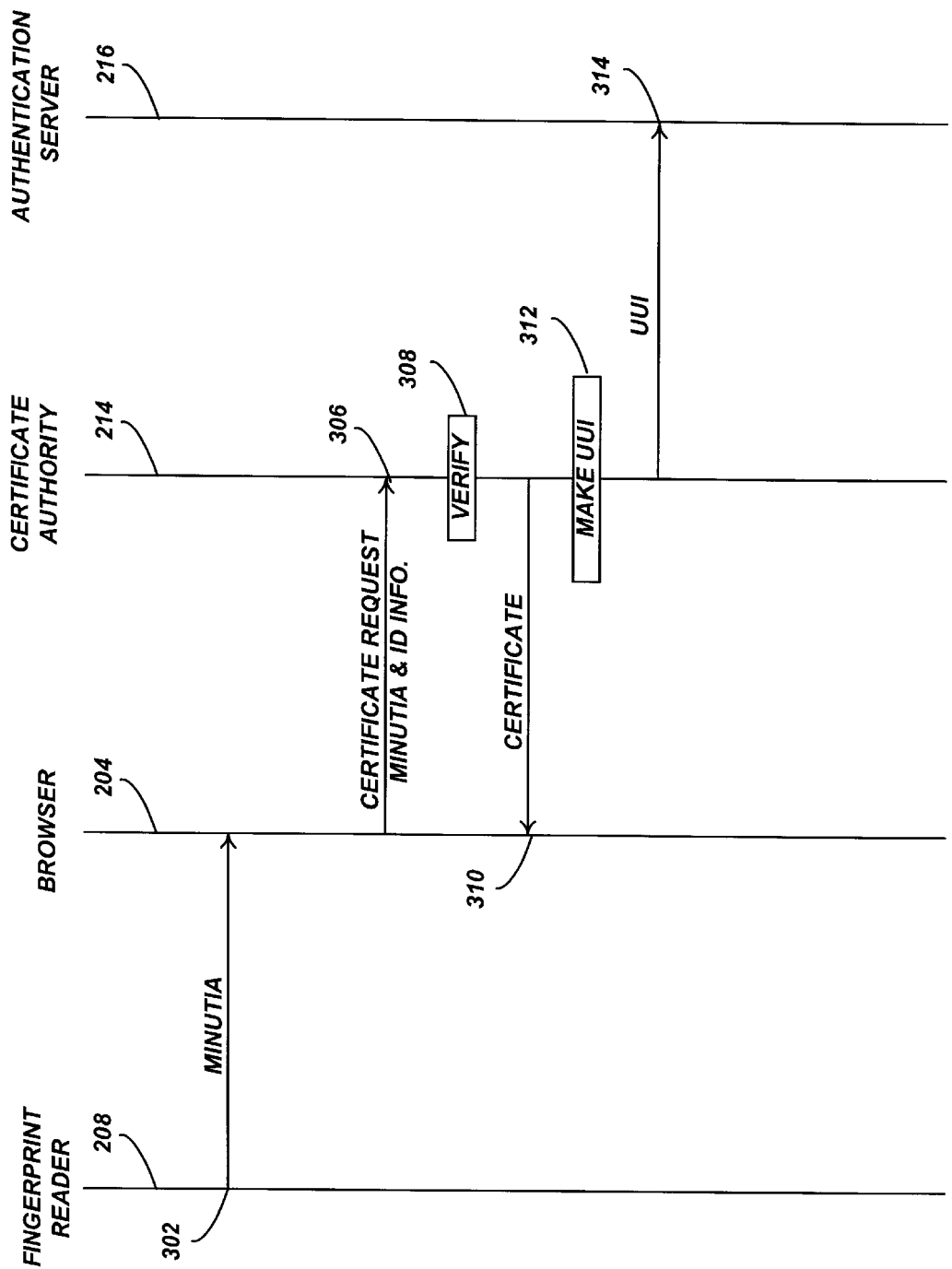
FIG. 3 is a flow diagram depicting a certificate registration process according to one implementation of the present invention.
Figure 4:
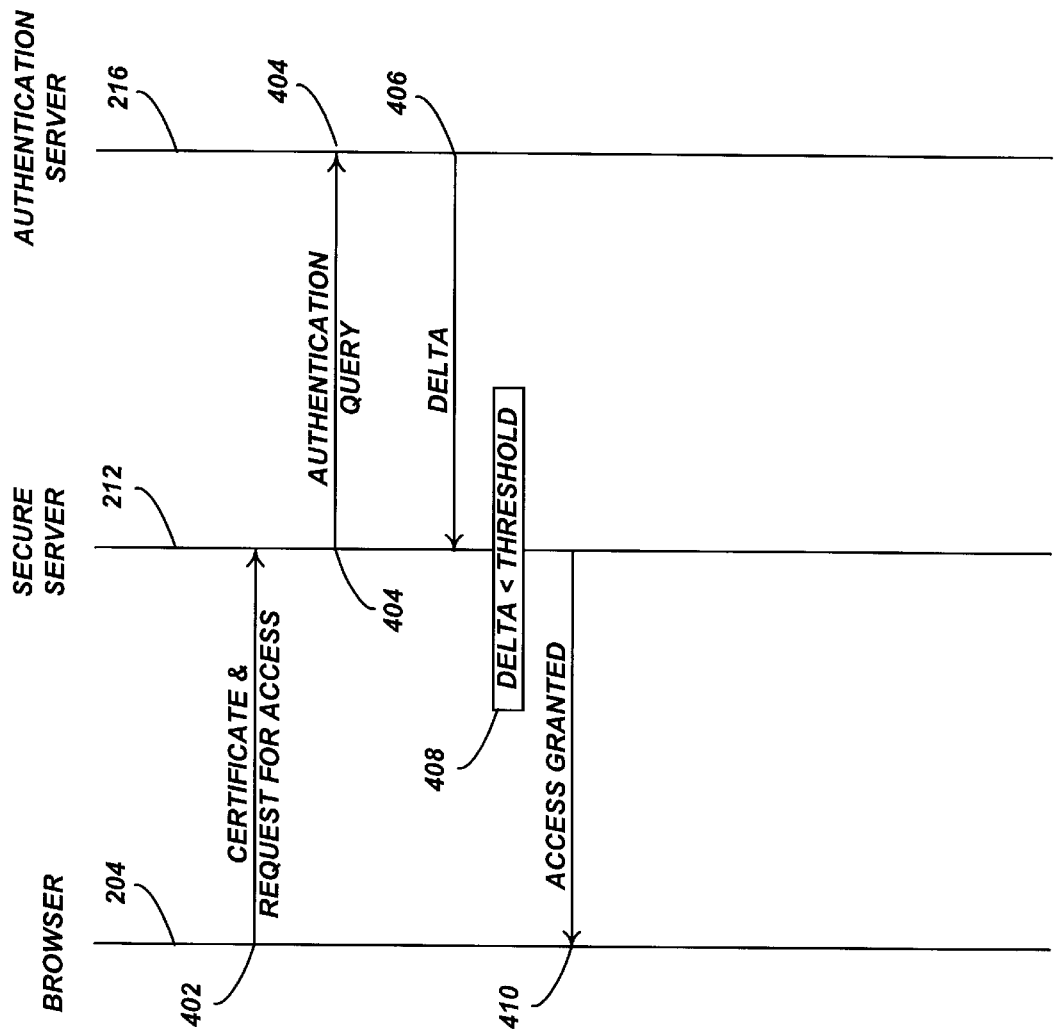
FIG. 4 is a flow diagram depicting a process for a browser to access a secure server according to an implementation of the invention.
Figure 5:
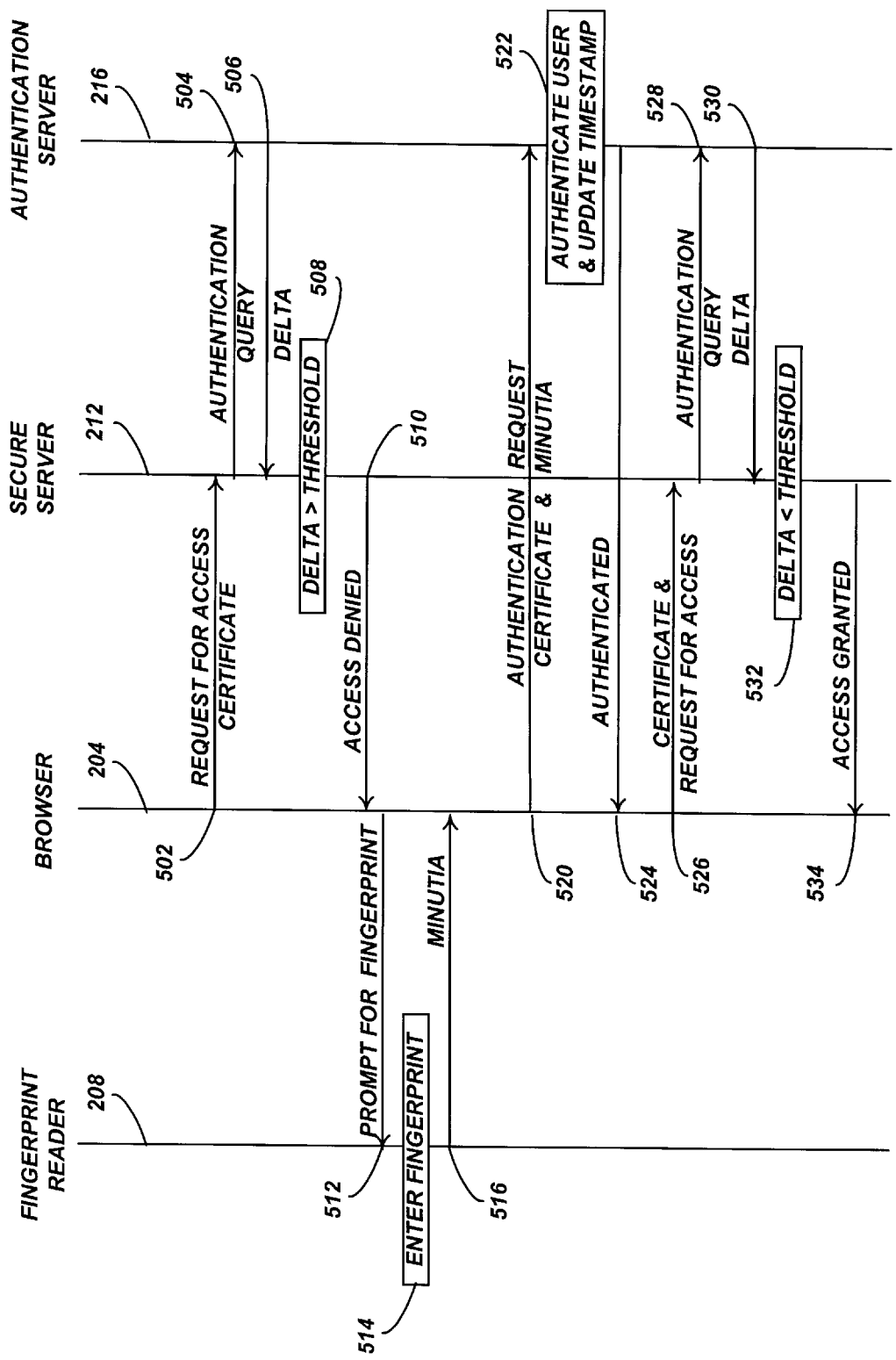
FIG. 5 is a flow diagram depicting a process for a browser to access a secure server when access is denied according to an implementation of the invention.

FIGS. 3, 4 and 5 are flow diagrams depicting processes according to implementations of the present invention. In each of these flow diagrams, time flows from top to bottom. FIG. 3 is a flow diagram depicting a certificate registration process according to one implementation of the present invention.

Referring to FIG. 3, a user 201 submits a fingerprint by placing a finger on fingerprint reader 208. Fingerprint reader 208 captures the fingerprint and generates information describing the fingerprint uniquely. This information is referred to herein as "minutia." The minutia are passed to the browser at 302. The user enters identification information using a keyboard (not shown) attached to client 202.

Browser 204 submits a certificate request to certificate authority 214 at 306. The certificate request includes the minutia and identification information. Certificate authority 214 verifies the identification information using conventional methods at 308. Certificate authority 214 generates a certificate according to conventional methods and sends the certificate to browser 204 at 310. The certificate authority creates a unique user identifier (UUI) at 312 that describes the minutia and a certificate identifier for the user's certificate.

The certificate identifier may be generated by generating a hash of the certificate serial number and a certificate authority issuer name.

In one implementation, the certificate authority combines the minutiae and the certificate identifier, and signs the combination using the private key of the certificate authority, to produce the UUI. This private key is the same private key used to sign the certificate sent to browser 204 at 310. This process effects a binding of the certificate and the minutia. This binding ensures that the certificate and minutia belong to the same individual, because neither the certificate nor the UUI can be modified without invalidating the signature of the certificate authority. The certificate authority then sends the UUI to authentication server 216 at 314. The authentication server stores the UUI.

At some point it may become necessary for a user to revise the authentication information that is bound with the user's certificate. For example, if a user injures the finger that is used for the fingerprint, the user may want to use a different finger for authentication. The user requests the certificate authority to revise the authentication information. In response, the certificate authority obtains the user's UUI from the authentication server and updates the UUI using the new fingerprint information. The revised UUI is then sent to the authentication server, where it replaces the former UUI.

FIG. 4 is a flow diagram depicting a process for a browser 204 to access secure server 212 according to an implementation of the invention. In response to a user command, browser 204 submits his certificate and a request for access to the secure server at 402. In one implementation, this transmission is handled by SSL. After receiving the access request, secure server 212 sends an authentication query to authentication server 216 at 404. Authentication server 216 determines the difference between the current time and the time at which the user was last authenticated by the authentication server. Authentication server 216 sends the difference, referred to as a "delta," to the secure server at 406. The process of authenticating user 201 at authentication server 216 is described in detail below with 30 reference to FIG. 5.

Secure server 212 compares the received delta to a predefined threshold at 408. For example, an on-line bookseller may define the threshold as two hours. Thus, if a user has been authenticated by an authentication server within the past two hours, the on-line bookseller grants that user access to its secure server. Secure servers may calibrate their level of risk by lowering the predefined threshold. For example, the more security is desired, the lower the threshold. If the received delta is less than the threshold, then a message indicating that access is granted to the secure server is sent to the browser at 410. The use of this threshold eliminates the need for the user to authenticate with the authentication server for each transaction. The user can simply authenticate with the authentication server once, and then access secure servers based on that authentication until a secure server requires the user to authenticate with the authentication server again. This mechanism also forces the user to authenticate at least once before accessing any secure servers.

FIG. 5 is a flow diagram depicting a process for a browser to access a secure server when access is denied according to an implementation of the invention. In response to a user command, browser 204 submits his certificate and a request for access to the secure server at 502. In one implementation, this transmission is handled by SSL. After receiving the access request, secure server 212 sends an authentication query to authentication server 216 at 504. Authentication server 216 responds with a "delta" at 506. The delta describes the amount of time that has elapsed since the user 201 was last authenticated by the authentication server.

The secure server compares the delta and threshold at 508, and determines that the delta is greater than the threshold. Therefore, the secure server denies access to the user at 510. In response to message 510, browser 204 prompts the user to enter a fingerprint at 512. The user enters the fingerprint at 514 using fingerprint reader 208, which sends minutia describing the fingerprint to the browser at 516. The browser sends an authentication request to the authentication server at 520. In one implementation the transmission is done via a secure transmission channel like SSL that uses the user and authentication server certificates to establish a secure connection. The authentication requests contains the user's certificate and minutia.

The authentication server authenticates the user by comparing stored minutia associated with the received certificate to the received minutia. If the stored and received minutia match, the authentication server authenticates the user at 522 and resets an authentication timestamp for the user to the current time. The authentication server informs the browser of the authentication by sending an "authenticated" message at 524.

In response to the "authenticated" message from the authentication server the browser repeats the access process of FIG. 4. For convenience, that process is repeated here.

Browser 204 submits the user's certificate and a request for access to the secure server at 526. After receiving the access request, secure server 212 sends an authentication query to authentication server 216 at 528. Authentication server 216 responds with a "delta" at 530. The delta describes the amount of time that has elapsed since the user 201 was last authenticated by the authentication server.

Secure server 212 compares the received delta to the predefined threshold at 532. If the received delta is less than the threshold, then a message indicating that access is granted to the secure server is sent to the browser at 534. In another implementation the results of the access attempts and/or the delta for the current user are stored in a cache on the secure server itself. The result is improved server and authentication server performance.

The present invention may be implemented using hardware, software or a combination thereof and may be implemented in a computer system or other processing system. In fact, in one implementation, the invention is directed toward one or more computer systems capable of carrying out the functionality described herein. An exemplary computer system 600 is shown in FIG. 6. The computer system 600 includes one or more processors, such as processor 604. The processor 604 is connected to a communication bus 606. Various software implementations are described in terms of this exemplary computer system. After reading this description, it will become apparent to a person skilled in the relevant art how to implement the invention using other computer systems and/or computer architectures.

Computer system 600 also includes a main memory 608, such as random access memory (RAM), and can also include a secondary memory 610. The secondary memory 610 can include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well known manner. Removable storage unit 618, represents a floppy disk, magnetic tape, optical disk, etc. which is read by and written to by removable storage drive 614. As will be appreciated, the removable storage unit 618 includes a computer usable storage medium having stored therein computer software and/or data.

In alternative implementations, secondary memory 610 may include other similar devices for allowing computer programs or other instructions to be loaded into computer system 600. Such devices can include, for example, a removable storage unit 622 and an interface 620. Examples of such include a program cartridge and cartridge interface (such as that found in video game devices), a removable memory chip (such as an EPROM or PROM) and associated socket, and other removable storage units 622 and interfaces 620 which allow software and data to be transferred from the removable storage unit 618 to computer system 600.

Computer system 600 can also include a communications interface 624. Communications interface 624 allows software and data to be transferred between computer system 600 and external devices. Examples of communications interface 624 can include a modem, a network interface (such as an Ethernet card), a communications port, a PCMCIA slot and card, etc. Software and data transferred via communications interface 624 are in the form of signals which can be electronic, electromagnetic, optical or other signals capable of being received by communications interface 624. These signals 626 are provided to communications interface 624 via a channel 628. This channel 628 carries signals 626 and can be implemented using wire or cable, fiber optics, a phone line, a cellular phone link, an RF link and other communications channels.

In this document, the terms "computer program medium" and "computer usable medium" are used to generally refer to media such as removable storage device 618, a hard disk installed in hard disk drive 612, and signals 626. These computer program products are means for providing software to computer system 600.

Computer programs (also called computer control logic) are stored in main memory 608 and/or secondary memory 610. Computer programs can also be received via communications interface 624. Such computer programs, when executed, enable the computer system 600 to perform the features of the present invention as discussed herein. In particular, the computer programs, when executed, enable the processor 604 to perform the features of the present invention. Accordingly, such computer programs represent controllers of the computer system 600.

In an implementation where the invention is implemented using software, the software may be stored in a computer program product and loaded into computer system 600 using removable storage drive 614, hard drive 612 or communications interface 624. The control logic (software), when executed by the processor 604, causes the processor 604 to perform the functions of the invention as described herein.

In another implementation, the invention is implemented primarily in hardware using, for example, hardware components such as application specific integrated circuits (ASICs). Implementation of the hardware state machine so as to perform the functions described herein will be apparent to persons skilled in the relevant art(s). In yet another implementation, the invention is implemented using a combination of both hardware and software.

While various implementations of the present invention have been described above, it should be understood that they have been presented by way of example, and not limitation. Implementations of the present invention can be used whenever and wherever certificates are used.

Implementations of the present invention can be used in any network where a users attempts to access a secure resource. For example, an implementation of the present invention can be used to authenticate users attempting to access servers on a local area network. Windows 2000™ and Novell Netware™ 5.0 support mapping user accounts to certificates. In another example, an implementation of the present invention can be used to authenticate a user attempting to access a hardware device such as a locked door, an automobile ignition or an automated teller machine (ATM).

It will be apparent to persons skilled in the relevant art that various changes in form and detail can be placed therein without departing from the spirit and scope of the invention. Thus the present invention should not be limited by any of the above-described example implementations, but should be defined only in accordance with the following claims and their equivalents.

What is claimed is:

1. A method, comprising:
receiving a certificate request from a user, the certificate request including identification information and authentication information associated with the user;
verifying the identification information;
issuing a certificate to the user when the identification information is verified;
signing a combination of the authentication information and a certificate identifier for the certificate to form a unique user identifier;
signing the authentication information; and
sending the unique user identifier to an authentication server that is configured to authenticate the user in reference to the sent information.

2. The method of claim 1, wherein the authentication information includes at least one of a password, smartcard information, and biometric information.

3. The method of claim 2, wherein the biometric information includes information describing at least one of a fingerprint, facial scan, voice print, or iris scan of the user.

4. A method for use in a secure server, comprising:
receiving a certificate for a user and a request for access for the user to the secure server;
sending an authentication query regarding the user to an authentication server;
receiving a delta in response to the authentication query, the delta indicating the amount of time that has passed since the user was last authenticated by the authentication server;
comparing the delta to a predefined threshold; and
granting access when the predefined threshold exceeds the delta.

5. The method of claim 4, further comprising:
denying access when the delta exceeds the predefined threshold.

6. A method, comprising:
sending a request for access to a secure server, the request containing a certificate associated with a user;
signing a combination of authentication information and a certificate identifier for the certificate to form a unique user identifier;
signing the authentication information;
sending the unique user identifier, when the secure server denies access, to an authentication server configured to authenticate the user in reference to the sent information; and sending the certificate and request to the secure server again when an indication of authentication is received from the authentication server.

7. A method for use in an authentication server, comprising:

receiving, from a secure server, a request to authenticate a user;

determining a delta indicating the amount of time that has passed since the user was last authenticated by the authentication server; and sending the delta to the secure server.

8. The method of claim 7, further comprising:

receiving a certificate and authentication information from a user that has been denied access to a secure server;

authenticating the user based on the certificate, the received authentication information, and stored authentication information associated with the certificate; and resetting the delta when the user is authenticated.

9. A computer program product, tangibly stored on a machine-readable medium, comprising instructions operable to cause a programmable processor to:

receive a certificate request from a user, the certificate request including identification information and authentication information associated with the user;

verify the identification information;

issue a certificate to the user when the identification information is verified;

sign a combination of the authentication information and a certificate identifier for the certificate to form a unique user identifier;

sign the authentication information; and send the unique user identifier to an authentication server operable to authenticate the user in reference to the sent information.

10. The computer program product of claim 9, wherein the authentication information includes at least one of a password, smartcard information, and biometric information.

11. The computer program product of claim 10, wherein the biometric information includes information describing at least one of a fingerprint, facial scan, voice print, or iris scan of the user.

12. A computer program product, tangibly stored on a machine-readable medium, for use in a secure server, comprising instructions operable to cause a programmable processor to:

receive a certificate for a user and a request for access for the user to the secure server;

send an authentication query regarding the user to an authentication server;

receive a delta in response to the authentication query, the delta indicating the amount of time that has passed since the user was last authenticated by the authentication server;

compare the delta to a predefined threshold; and grant access when the predefined threshold exceeds the delta.

13. The computer program product of claim 12, further comprising instructions to cause a programmable processor to:

deny access when the delta exceeds the predefined threshold.

14. A computer program product, tangibly stored on a machine-readable medium, comprising instructions operable to cause a programmable processor to:

sign a combination of authentication information and a certificate identifier for a certificate associated with a user to form a unique user identifier;

sign the authentication information;

send a request for access to a secure server, the request containing a certificate associated with a user;

send the unique user identifier, when the secure server denies access, to an authentication server operable to authenticate the user in reference to the sent information; and send the certificate and request to the secure server again when an indication of authentication is received from the authentication server.

15. A computer program product, tangibly stored on a machine-readable medium, comprising instructions operable to cause a programmable processor to:

receive, from a secure server, a request to authenticate a user;

determine a delta indicating the amount of time that has passed since the user was last authenticated by the authentication server; and send the delta to the secure server.

16. The computer program product of claim 15, further comprising instructions operable to cause a programmable processor to:

receive a certificate and authentication information from a user that has been denied access to a secure server;

authenticate the user based on the certificate, the received authentication information, and stored authentication information associated with the certificate; and reset the delta when the user is authenticated.

17. An authentication system, comprising a server configured to:

receive a certificate request from a user, the certificate request including identification information and authentication information associated with the user;

verify the identification information;

issue a certificate to the user when the identification information is verified;

sign a combination of the authentication information and a certificate identifier for the certificate to form a unique user identifier;

sign the authentication information; and send the unique user identifier to an authentication server that is configured to authenticate the user in reference to the sent authentication information.

18. An authentication system, comprising a server configured to:

receive a certificate for a user and a request for access for the user to the secure server;

send an authentication query regarding the user to an authentication server;

receive a delta in response to the authentication query, the delta indicating the amount of time that has passed since the user was last authenticated by the authentication server;

compare the delta to a predefined threshold; and when the predefined threshold exceeds the delta, denying access and causing a request for authentication information, including biometric information, to be sent to the user.

* * * * *